No. 787,284. PATENTED APR. 11, 1905.
H. F. T. ERBEN.
SPEED LIMITING DEVICE.
APPLICATION FILED AUG. 30, 1901.

3 SHEETS—SHEET 1.

Witnesses:
Marcus L. Byng.
Benjamin B. Hull

Inventor:
Hermann F. T. Erben,
by Albert G. Davis
Att'y.

No. 787,284. PATENTED APR. 11, 1905.
H. F. T. ERBEN.
SPEED LIMITING DEVICE.
APPLICATION FILED AUG. 30, 1901.
3 SHEETS—SHEET 2.
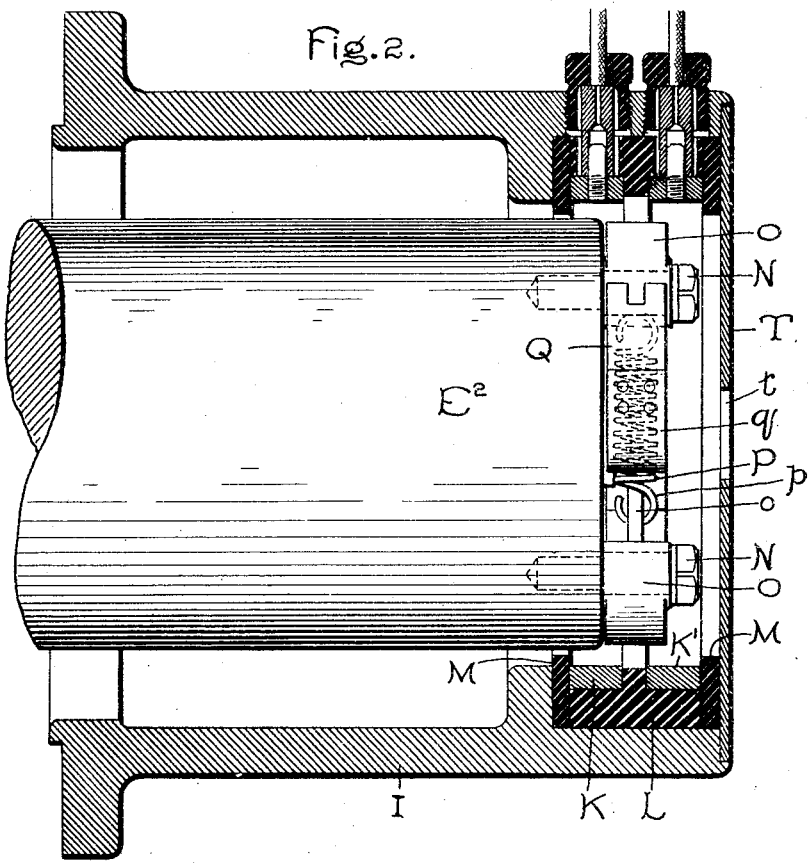
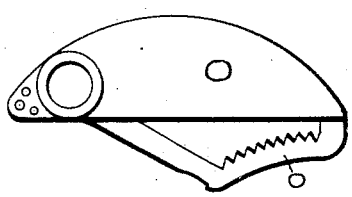
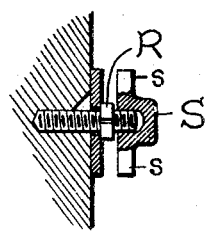
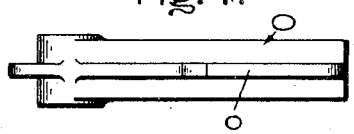
Witnesses:
Marcus L. Byng.
Benjamin B. Hull.
Inventor.
Hermann F. T. Erben,
by Albert G. Davis
Att'y.

No. 787,284. PATENTED APR. 11, 1905.
H. F. T. ERBEN.
SPEED LIMITING DEVICE.
APPLICATION FILED AUG. 30, 1901.

3 SHEETS—SHEET 3.

Witnesses:
Marcus L. Byng.
Benjamin B. Hull.

Inventor:
Hermann F. T. Erben,
by Albert G. Davis
Att'y.

No. 787,284.   Patented April 11, 1905.

UNITED STATES PATENT OFFICE.

HERMANN F. T. ERBEN, OF SCHENECTADY, NEW YORK, ASSIGNOR TO GENERAL ELECTRIC COMPANY, A CORPORATION OF NEW YORK.

SPEED-LIMITING DEVICE.

SPECIFICATION forming part of Letters Patent No. 787,284, dated April 11, 1905.

Application filed August 30, 1901. Serial No. 73,831.

*To all whom it may concern:*

Be it known that I, HERMANN F. T. ERBEN, a citizen of the United States, residing at Schenectady, in the county of Schenectady and State of New York, have invented certain new and useful Improvements in Speed-Limiting Devices, of which the following is a specification.

This invention relates to speed-controlling devices for rotating machines; and its object is to provide means whereby such a machine will be automatically stopped in case it exceeds or falls below predetermined limits of speed.

The invention has been designed for use with booster sets in electric-railway systems; but it is applicable to any dynamo, rotary converter, or other machine which it is desirable or necessary to keep within definite speed limits.

It is found that a series-wound booster will under certain conditions reverse its direction of rotation and run away if the driving-motor becomes disconnected, as by the slipping of a belt, or is open-circuited in any manner, as by the tripping of its circuit-breaker. The booster for the time being becomes a motor driven by the line-current or that of the storage battery in case one is used, and having no load it quickly attains such speed as to wreck itself and possibly damage adjacent apparatus. My invention aims to prevent this by automatically open-circuiting the booster as it slows down and before it can stop and reverse its direction of rotation. The device is also designed to effect the same result in case the speed of the booster should exceed a safe limit.

In brief, the invention consists in a movable switch or circuit-closer comprising a weight free to be moved by centrifugal force when the booster is running and operating to close the circuit of a circuit-breaker in the booster-circuit by an excessive movement either away from or toward the axis of rotation.

Figure 1:
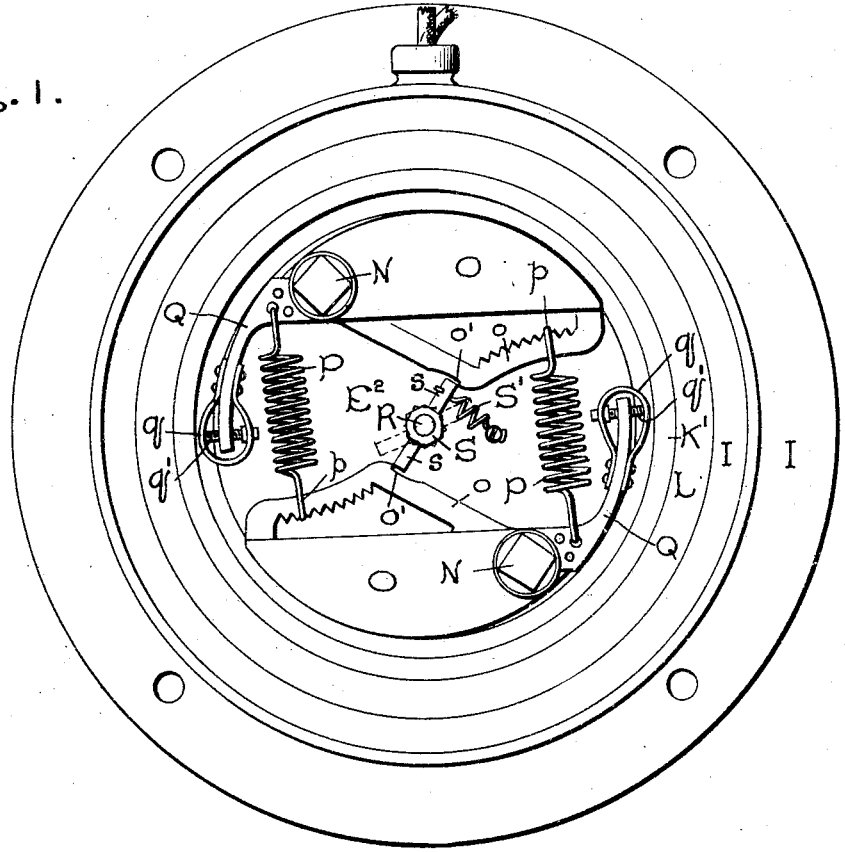
Figure 6:
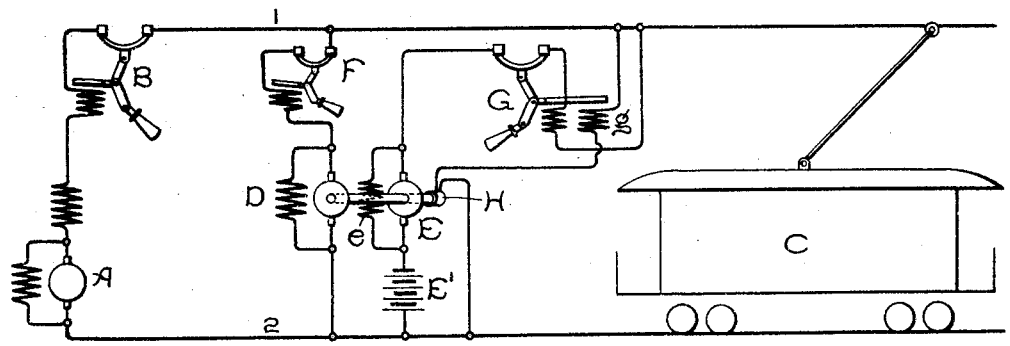
Figure 7:
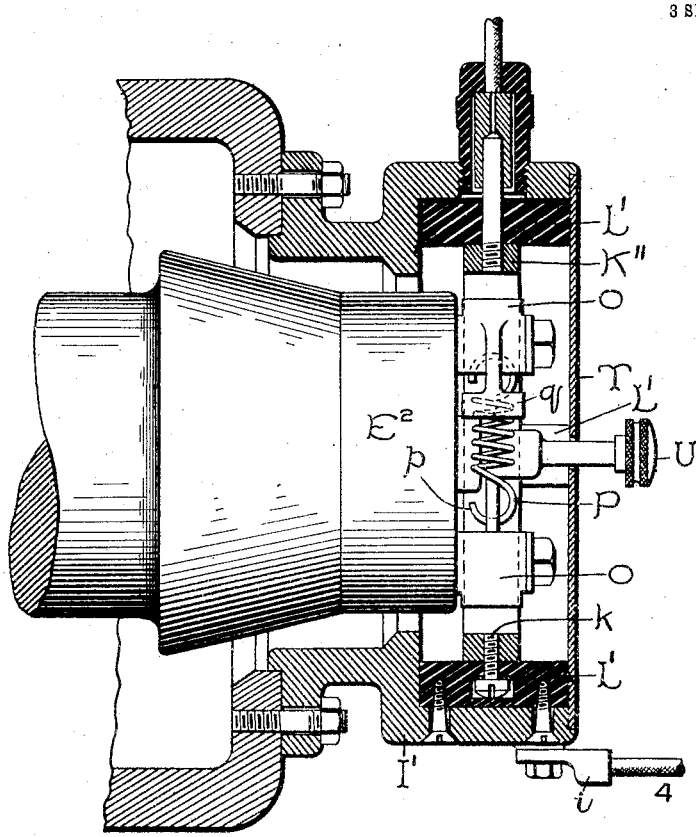
Figure 8:
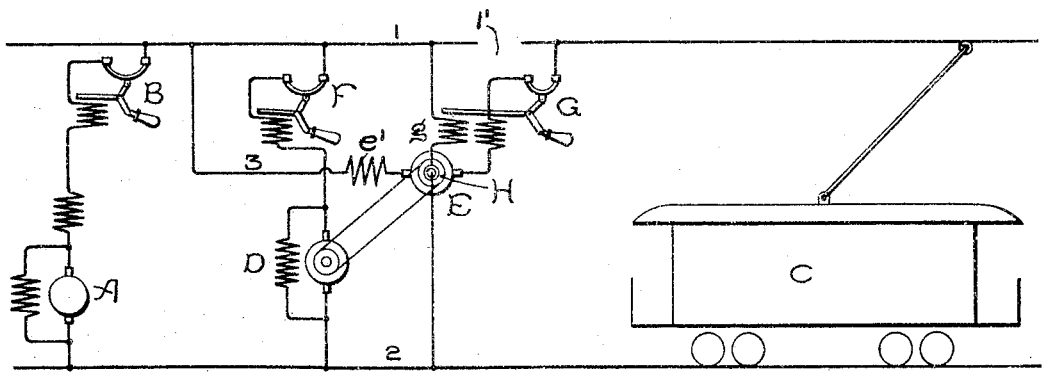

In the accompanying drawings, Figure 1 is an end elevation of a booster-shaft equipped with my improved centrifugal circuit-closer, the cover-plate being removed. Fig. 2 is a longitudinal axial section of the same, with the cover-plate on. Fig. 3 is a side view of one of the movable weights. Fig. 4 is an edge view of the same. Fig. 5 is a section of the resetting device. Fig. 6 is a diagram of circuits. Fig. 7 is a longitudinal section of a modification. Fig. 8 is a modified diagram of circuits.

Referring first to said diagrams, A is a compound-wound generator supplying current through a circuit-breaker B to the main leads 1 2 and to the load, which may be, for instance, a trolley-car C. At D is a shunt-wound motor connected across the line and driving, either by a common shaft, by belt, or otherwise, the booster E, which in Fig. 6 has a shunt field-coil $e$ and in Fig. 8 has a series field-winding $e'$. A circuit-breaker F is in circuit with the motor D, and another one, G, is in circuit with the booster, which is connected either across the line through a storage battery $E'$, as shown in Fig. 6, or in series with a feeder 3, as shown in Fig. 8. In the construction shown in Fig. 8 the main lead 1 is broken at $1'$. An additional coil $g$ is wound on the electromagnet of the circuit-breaker G and is connected across the line in series with my automatic circuit-closer H on the shaft of the booster, so that when the latter closes the coil $g$ will trip the circuit-breaker G and open the circuit of the booster. The circuit-closer is preferably constructed as follows: Adjacent the end of the shaft $E^2$ of the booster is a stationary support I, such as a sleeve, concentric with but not in contact with said shaft. One or more metallic rings K K' are mounted inside the sleeve adjacent to the end of the shaft and insulated from the sleeve and from each other, as by a ring L, of hardwood or the like, under the rings K K' and rings M of insulation on each side of them. One of the rings, as K, is in circuit with the main 1 and the circuit-breaker G. The other ring is connected with the main 2. At diametrically opposite points on the end of the shaft $E^2$ two studs N are screwed into the shaft, and on each stud a weight O is pivoted near one end, having, preferably, a curved outside edge. Projecting from the inner edge is a thin yoke or arm $o$, affording means of attachment for one end of a helical spring P, whose other end is attached to the opposite weight at a point on the other side of and close to the stud N. Means are provided for adjusting the spring along the arm $o$ toward or away from the long end of the weight, such as a series of notches on the inner edge of the arm engaging with the hook or eye $p$ at the end of the spring. Secured to each weight, at the short end thereof, is a tailpiece Q, carrying a flexible loop $q$ of copper or the like, which is adjustable radially of the shaft by a screw $q'$ in the end of the tailpiece. At the center of the shaft $E^2$ is a stud R, on which is rotatably mounted a hub S, having two arms $s$, to one of which a small spring S' is attached. The hub is preferably polygonal to receive a wrench for turning it. A plate T covers the end of the sleeve I, being provided with a central hole $t$ for the insertion of said wrench. This plate is not shown in Fig. 1, being removed, together with the outer ring M, to give a better view of the parts. The arms $s$ are long enough to engage with the outer edges of the arms $o$ on the weights and force them apart to a normal position. When the machine is at rest, the springs would naturally keep the weights pulled inward, and the circuit of the coil $g$ would thus be closed through the tailpieces. To prevent this, the hub S is turned into the position shown in Fig. 1, the arms S forcing the weights apart until they engage with notches $o'$ in the edges of the arms $o$, whereby they are locked. As soon as the machine gets up speed the centrifugal force throws the weights outwardly slightly, releasing the arms $s$, which are at once turned by the spring to the dotted-line position, leaving the weights room to move freely.

The operation of my invention is as follows: When the machine is running at normal speed, the weights stand in the position shown in Fig. 1, both weights and tailpieces being out of contact with the rings K K'; but if for any reason the speed slackens below a predetermined limit, as in case the belt slips off, Fig. 8, or the shaft breaks, Fig. 6, or the circuit-breaker F opens the motor-circuit, then the weights O will be drawn in by the springs P and the tailpieces Q will be thrown out into contact with both the rings K K', thereby closing the circuit through the coil $g$, tripping the circuit-breaker G, and thus stopping the machine. On the other hand, if the speed should happen to increase beyond a safe limit the weights fly outward and make contact with the rings and trip the circuit-breaker G.

In Fig. 7 a single contact-ring K" is used, secured to insulating-blocks L', as by insulated screws $k$. At U is shown the socket-wrench for operating the resetting arrangement S. The ring K" is in circuit with the auxiliary coil $g$ and one main, 1, while the shaft $E^2$ is in circuit with the other main, 2, through its journal-bearing, the machine-frame, the sleeve I', the terminal $i$, and conductor 4. The single-ring arrangement is in some respects more reliable than the double-ring form. In the latter the weights may possibly get bent or worn, so that they do not make contact with both rings at once, and thus fail to close the circuit; but in the single-ring form the weight is itself one terminal of the circuit, so that the instant it touches the ring the circuit is closed.

What I claim as new, and desire to secure by Letters Patent of the United States, is—

1. A centrifugal circuit-closer, comprising a rotating shaft, a stationary annular contact concentric with said shaft, a centrifugally-movable contact on said shaft, and an external circuit whose terminals are connected respectively with said contacts.

2. A centrifugal circuit-closer, comprising a rotating shaft, a stationary annular contact concentric with said shaft, a weight pivoted on said shaft, and an external circuit whose terminals are connected respectively with the annular contact and the weight.

3. The combination with a rotatable shaft, of a single stationary ring-contact concentric therewith and forming one terminal of a circuit, and a weight pivoted on said shaft in the plane of said ring, and forming the other terminal of the circuit.

4. A centrifugal circuit-closer, comprising a rotating shaft, a stationary annular contact concentric with said shaft, studs projecting from the ends of said shaft, weights pivoted on said studs, springs connecting said weights, and an external circuit whose terminals are connected respectively with said annular contact and said weights.

5. A centrifugal circuit-closer, comprising a stationary sleeve, a contact-ring inside of and insulated from said sleeve, a rotatable shaft concentric with said sleeve, a weighted contact pivoted to the shaft, and an external circuit whose terminals are connected respectively with said ring and said weight.

6. The combination with a rotatable shaft, of a stationary sleeve concentric therewith and in electrical circuit with said shaft, a single-ring contact supported by and insulated from said sleeve, a pair of weights pivoted on the shaft in the plane of the ring, springs connecting said weights, and two terminals of a circuit, one connected with the sleeve and the other with the ring.

7. A centrifugal circuit-closer, comprising a rotating shaft, a stationary ring-contact concentric with said shaft, one or more studs projecting from the end of said shaft, a weight pivoted on each stud and adapted to make contact with said ring on an increase of speed, and a tailpiece on said weight adapted to make contact with said ring on a decrease of speed.

8. A centrifugal circuit-closer, comprising a rotating weight provided with a tailpiece having a flexible contact.

9. A centrifugal circuit-closer, comprising a rotating weight provided with a tailpiece carrying a flexible metallic loop.

10. A centrifugal circuit-closer, comprising a rotating weight provided with a tailpiece carrying a flexible metallic loop, and means for adjusting said loop.

11. A centrifugal circuit-closer, comprising a rotating weight provided with a tailpiece carrying a flexible metallic loop, and a screw in said tailpiece for adjusting said loop laterally.

12. A centrifugal circuit-closer, comprising two pivoted weighted contacts connected by springs, and a device for moving and holding said contacts out of circuit when the apparatus is not in motion.

13. A centrifugal circuit-closer, comprising two pivoted weighted contacts, springs tending to move them together, and a rotatable device for separating said contacts against the tension of said springs.

14. A centrifugal circuit-closer, comprising two pivoted weighted contacts, springs tending to move them together, and means for holding them apart when still and automatically releasing them when in motion.

15. A centrifugal circuit-closer, comprising two pivoted weighted contacts, springs tending to move them together, a rotatable hub carrying arms adapted to separate said weights, and a spring to disengage said arms from said weights.

In witness whereof I have hereunto set my hand this 29th day of August, 1901.

HERMANN F. T. ERBEN.

Witnesses:
BENJAMIN B. HULL,
CHARLES STEINER.